Patented Aug. 16, 1949

2,479,148

UNITED STATES PATENT OFFICE 2,479,148

5-CROTYL-5-PHENYLBARBITURIC COMPOUNDS

Gordon A. Alles, Los Angeles, Calif.

No Drawing. Application October 20, 1947,
Serial No. 781,015

5 Claims. (Cl. 260—257)

This invention relates to new and useful chemical compounds. The principal object of the invention is to provide new chemical compounds which are useful as medical preparations, either alone or together with other substances.

The compounds of my present invention comprise 5-crotyl-5-phenylbarbituric compounds of the structural formula:

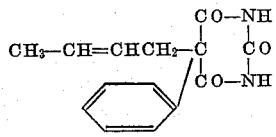

and include both 5-crotyl-5-phenylbarbituric acid and its salts wherein a hydrogen atom attached to a nitrogen atom of the heterocyclic ring is replaced by another atom or group carrying a positive charge. In preparing particular medical preparations, the acids or salts may be conjugated or compounded with other substances.

The physiological effects of the compounds are distinct from those of a lower alkenyl derivative of phenylbarbituric acid, such as 5-allyl-5-phenylbarbituric acid, in that while they are less active and relatively ineffective as hypnotic agents they are more effective as depressants of parts of the central nervous system other than those dominant in their control of sleep. The crotylphenylbarbituric compounds of the invention exert useful anticonvulsive and sedative actions that may be applied in the treatment of epilepsy and related conditions resulting from excessive activity of parts of the central nervous system. The differential in effect on these parts of the central nervous system as compared with effects on sleep centers with the crotylphenylbarbituric compounds of the invention is such that they exert notable anticonvulsant activity with doses not producing considerable hypnotic effect. The isomeric β-methallyl derivative of phenylbarbituric acid has been investigated by me and is notably less active in exhibiting anticonvulsant effects. The crotylphenylbarbituric compounds of the invention are also of value as intermediates for the preparation of other chemical substances and medically valuable compositions.

It has been found that the intermediates and methods of synthesis that may be successfully employed in the preparation of these compounds are considerably limited by the need of a minimum degree of reactivity of such intermediates and also by the tendency of the crotyl intermediates to rearrange in reactions to mixtures of crotyl and methylvinylcarbinyl compounds. By following the procedure described in the following example the preparation can be carried out with suitable yields. It may be possible that other satisfactory methods of synthesis will be found later and the following example is given to indicate only how the compounds may be prepared and represent no limitation upon the final product.

Metallic sodium (48 grams or 2.1 mole) is reacted with 600 milliliters of ethanol and 300 milliliters is distilled out from the reaction product under reduced pressure. A mixture of ethyl phenylacetate (328 grams or 2.0 mole) and diethyl carbonate (708 grams or 6.0 mole) is added to the sodium ethylate preparation and allowed to stand overnight. The resultant mixture is then heated in an oil bath with stirring and the remaining ethanol distilled off under reduced pressure, requiring about 4 hours in time. After cooling the residual mixture to below 80° C., crotyl chloride (192 grams or 2.2 mole) is slowly added and then sodium iodide (3 grams or 0.02 mole) is further added and the mixture heated in an oil bath at 110° C. for 12 hours with stirring. After this the remaining diethyl carbonate is distilled out from the mixture and the residual high boiling liquid fractionated under reduced pressure to yield ethyl crotylphenylmalonate boiling at 135–139° C. under pressure of 1 millimeter of mercury.

Metallic sodium (72 grams or 3.12 mole) is dissolved in 1200 milliliters of ethanol and molten urea (270 grams or 4.5 mole) is added and the solution cooled to 30° C. To this solution is added 435 grams (1.5 mole) of ethyl crotylphenylmalonate and the mixture then allowed to stand for four days at room temperatures, then heated at 83–85° C. for 30 hours. The ethanol is evaporated off from the mixture by heating in a large evaporating dish in a steam bath and the residue taken up with 2000 milliliters of cold water. Undissolved solid is filtered off and the filtrate acidified with glacial acetic acid. The precipitate formed is filtered off, then crystallized from ethanol and dried. This product is 5-crotyl-5-phenylbarbituric acid in white crystals melting at 209–210° C. and suitable for medical preparations. By repeated recrystallization from boiling 50% ethanol-water mixtures a product melting as high as 212–212.5° C. may be obtained.

The crotylphenylbarbituric acid prepared as described above is soluble with difficulty in water, but soluble in the usual organic solvents like acetone, alcohol, ether and ethyl acetate. The water soluble sodium salt thereof is readily formed in water solution by dissolving the acid with an equivalent of sodium hydroxide or may be obtained in solid form by treatment of the acid with an equivalent of sodium ethylate in ethanol followed by the addition of ether. Other salts, such as those of calcium, magnesium, ammonium or with bases such as the organic amines, may be prepared from the acid by similar neutralization procedures and are essential equivalents of the sodium salt and, as such, are included within the scope of this invention.

In medical preparations the nature and proportions of other ingredients that may be conjugated or compounded with the crotylphenylbarbituric compounds are subject to variation dependent upon the medical effect to be obtained and the method by which the compound is to be administered. For oral administration capsules containing from 16 to 96 milligrams of the sodium salt of crotylphenylbarbituric acid alone or together with other substances may be prepared. An elixir may be preferred, however, and such an elixir may be prepared by dissolving 3.2 grams of crotylphenylbarbituric acid in 1 liter of compound aromatic elixir containing 24 volume per cent of ethanol. Tablets are often most suitable for therapy and may be prepared to contain from 16 to 96 milligrams of crotylphenylbarbituric acid or its sodium salt, combined with enough lactose to make a total weight of about 250 milligrams.

I claim:
1. A 5-crotyl-5-phenylbarbituric compound of the group consisting of 5-crotyl-5-phenylbarbituric acid and salts thereof.
2. A 5-crotyl-5-phenylbarbituric compound of the group consisting of 5-crotyl-5-phenylbarbituric acid and the sodium salt thereof.
3. 5-crotyl-5-phenylbarbituric acid.
4. A salt of 5-crotyl-5-phenylbarbituric acid.
5. The sodium salt of 5-crotyl-5-phenylbarbituric acid.

GORDON A. ALLES.

REFERENCES CITED

The following references are of record in the file of this patent:

UNITED STATES PATENTS

| Number | Name | Date |
|---|---|---|
| 1,584,156 | Ursum et al. | May 11, 1926 |
| 2,106,138 | Shonle | Jan. 18, 1938 |
| 2,250,422 | Shonle | July 22, 1941 |

FOREIGN PATENTS

| Number | Country | Date |
|---|---|---|
| 151,516 | Switzerland | Dec. 24, 1930 |